United States Patent [19]

Milaire

[11] Patent Number: 5,067,049
[45] Date of Patent: Nov. 19, 1991

[54] PHOTOGRAPHIC STUDIO LIGHT REFLECTING APPARATUS

[76] Inventor: Daniel P. F. Milaire, 34288 Woodbine Crescent, Abbotsford, British Columbia, Canada, V2S 2R5

[21] Appl. No.: 478,952

[22] Filed: Feb. 12, 1990

[51] Int. Cl.⁵ .............................................. G03B 15/02
[52] U.S. Cl. ..................................... 362/18; 362/322; 362/145; 362/285; 354/290; 354/291
[58] Field of Search ..................... 362/3, 7, 11, 16, 17, 362/18, 285, 277, 278, 282, 283, 145, 147, 320, 346, 322, 341, 301; 354/290, 291; 350/626, 632

[56] References Cited

U.S. PATENT DOCUMENTS

| | | | |
|---|---|---|---|
| 31,444 | 2/1861 | Dodge | 362/17 |
| 384,151 | 6/1888 | Gould | 362/16 |
| 523,323 | 7/1894 | Clinedinst, Jr. | 362/16 |
| 1,216,696 | 2/1917 | John | 362/7 |
| 2,763,772 | 9/1956 | Hine | 354/126 |
| 2,827,553 | 3/1958 | Riches | 362/320 |
| 2,913,569 | 11/1959 | Edelstein | 362/18 |
| 3,516,343 | 6/1970 | Tunney | 354/290 |
| 3,712,978 | 1/1973 | Lowell | 362/322 |
| 3,952,322 | 4/1976 | Wolfe | 354/290 |
| 4,383,287 | 5/1983 | Fette | 362/220 |
| 4,428,030 | 1/1984 | Ballozian | 362/18 |
| 4,475,146 | 10/1984 | Wally, Jr. | 362/11 |
| 4,872,031 | 10/1989 | Balioziar | 354/291 |

FOREIGN PATENT DOCUMENTS

| | | | |
|---|---|---|---|
| 0158983 | 4/1985 | European Pat. Off. | |
| 777189 | 2/1935 | France | 354/290 |

Primary Examiner—Ira S. Lazarus
Assistant Examiner—D. M. Cox
Attorney, Agent, or Firm—Shlesinger, Arkwright, Garvey

[57] ABSTRACT

The invention provides a photographic studio light reflecting apparatus which is low cost, portable and easily adjustable to provide a wide range of lighting effects. The apparatus comprises first and second laterally spaced apart vertically side wall pairs, each pair having stationary and movable side wall panels. The apparatus also has a horizontal top wall panel supported on and extending between the stationary side wall panels. All the panels have inwardly facing diffused light reflecting surfaces to reflect light from conventional studio lights onto the subject. The movable panels are clear of the top wall panel to permit relative movement therebetween to vary lighting effects.

18 Claims, 3 Drawing Sheets

PHOTOGRAPHIC STUDIO LIGHT REFLECTING APPARATUS

BACKGROUND OF THE INVENTION

This invention relates to a photographic studio lighting reflector.

Lighting reflectors have been developed in the past and are used in photographic studios to control shadows on subjects. Some prior art reflectors use an umbrella-like device having an inner reflective panel which reflects light from a separate conventional electrical lamp onto the subject. Usually two separate umbrella reflectors mounted on tripods are used to reflect light from two separate lamps onto the subject. The intensity of the reflected light varies and is dependent on the angle and distance of the umbrella-like devices from the subject, and requires skill and time to set up. Such lighting is usually used in a windowless studio with a selectable background.

The inventor is aware of the following prior art references which disclose several forms of photographic lighting reflectors.

U.S. Pat. No. 523,323 issued to Clinedinst Jr. discloses a light reflecting apparatus comprising spaced apart vertical side walls with an angled roof supported thereon. The side walls are formed of three frames which are hinged together to vary light reflection, but no means appear to be shown to support the roof for widely varying angles of deflection of the panels. U.S. Pat. No. 384,151 issued to Gould discloses a lighting apparatus in which a fixed housing or enclosure mounting lights also provides a plurality of translucent panels which permit the light to pass therethrough to diffuse the light to reduce undesirable harsh shadows. The two patents above provide enclosures which are essentially independent of the room containing the enclosure, and provide a measure of light control.

U.S. Pat. Nos. 1,216,696 issued to John, 1,085,500 issued to Shoberg, and 2,913,569 issued to Edelstein all disclose lighting devices in which a light source is fitted in front of a reflector assembly, and the reflector assembly has portions which can be moved relative to each other so as to vary lighting effects thrown onto a subject. The latter three patents clearly require additional surrounding material to eliminate undesirable background, and preferably also to provide means to reduce effects of harsh lighting.

SUMMARY OF THE INVENTION

The invention reduces the difficulties and disadvantages of the prior art by providing a single enclosing structure which is independent of the room containing the apparatus and provides highly variable lighting reflectors combined with a variable background structure which increase versatility of the apparatus. Furthermore, the apparatus is lightweight, easily assembled and disassembled for storage and transportation within a standard commercial van, and can be manufactured for a relatively low cost. Thus, the apparatus can be quickly assembled in almost any building to provide an effective studio for portraits, which can produce excellent results with relatively unskilled persons operating the camera and lighting equipment.

The apparatus according to the invention comprises left hand and right hand laterally spaced apart vertical side wall pairs and a horizontal top wall panel. Each side wall pair has a stationary side wall panel and a movable side wall panel, with inwardly facing diffuse light reflecting surfaces. The top wall panel is supported on and extends between the stationary side wall panels and has a downwardly facing diffuse light reflecting surface. The movable panels are clear of the top wall panel to permit relative movement therebetween, so as to vary lighting on the subject.

Preferably, the movable wall panel and stationary wall panel of each vertical side wall pair are hinged together about a vertical hinge. Also, preferably a hair lighting means for mounting a light thereon is connected to the top wall panel, and a backdrop panel extends downwardly from the hair lighting means so as to permit variation of background for the subject.

Preferably, the top wall panel is generally flat and has opposite end portions releasably connected to adjacent top portions of the stationary wall panels. A brace extends releasably between each stationary side wall panel on the top wall panel to increase rigidity of the apparatus.

A detailed disclosure following, related to drawings, described a preferred embodiment of the apparatus which is capable of expression in structure other than that particularly described and illustrated.

DETAILED DISCLOSURE

FIGS. 1 AND 2

Figure 1:
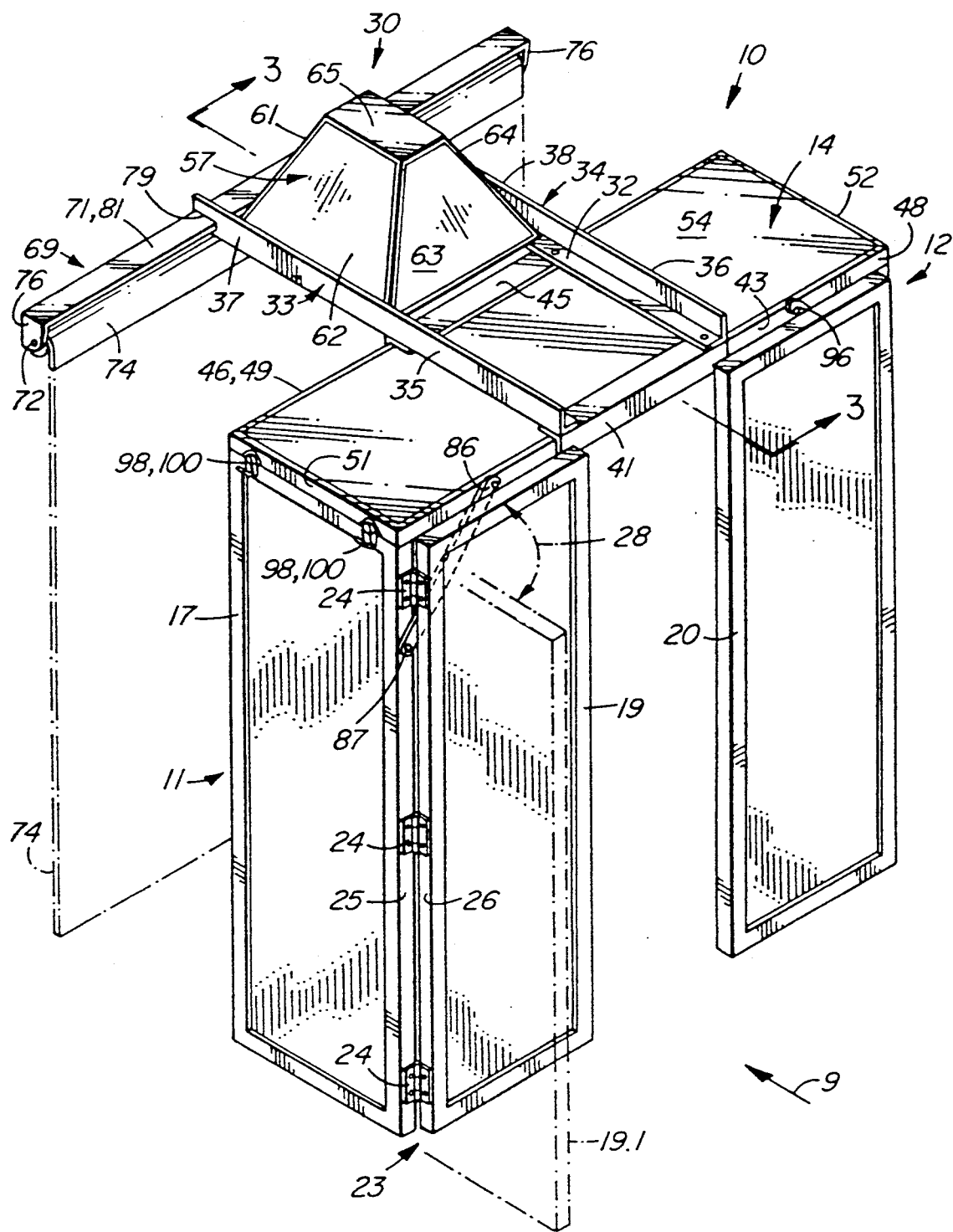
FIG. 1 is an isometric view of an assembled light reflecting apparatus of the invention, fitted with a hair lighting structure and associated backdrop panel.
Figure 3:
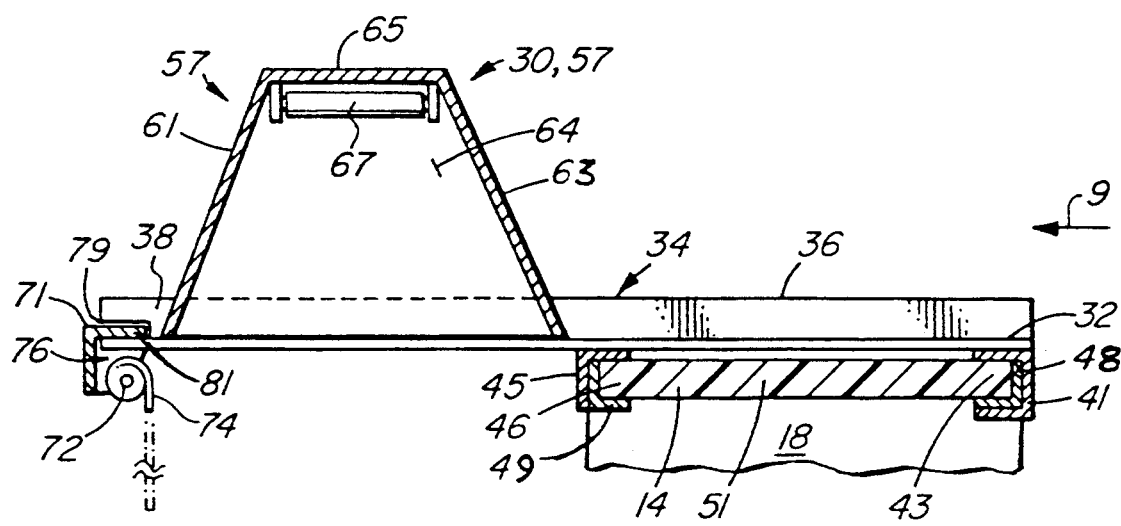
FIG. 3 is a simplified, fragmented cross-section of a top portion only of the apparatus as seen generally from 3—3 of FIG. 1, the apparatus being fitted with the hair lighting fixture and backdrop panel.

Relative directions such as left and right are defined with respect to a direction of view designated by an arrow 9, as seen by a camera or photographer, not shown in FIGS. 1 and 3.

Figure 5:
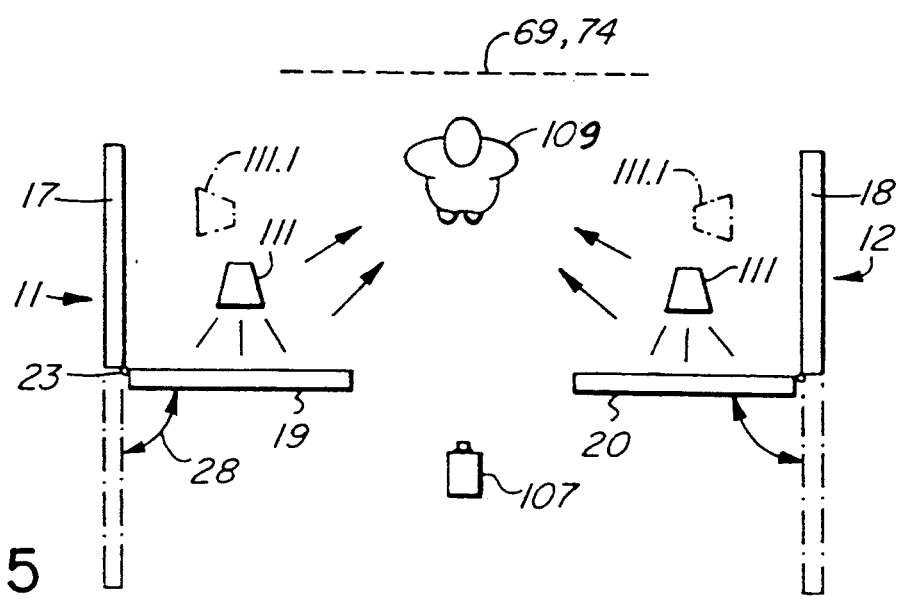
FIG. 5 is a simplified, fragmented top diagram showing main portions of the light reflecting apparatus, and relative positions of light sources, a camera and subject during use.

An apparatus 10 according to the invention comprises left hand and right hand laterally spaced apart vertical side wall pairs 11 and 12, and a horizontal top wall panel 14. The side wall pairs 11 and 12 have parallel stationary side wall panels 17 and 18 respectively, and movable side wall panels 19 and 20 respectively. The panel 14 is supported on and extends between the stationary side wall panels 17 and 18. All the panels have inwardly facing diffuse light reflecting surfaces which receive light from a light source to reflect it onto a subject, as will be described with reference to FIG. 5.

The side wall pairs are mirror images of each other, and thus only the side wall pair 11 will be described in detail. The movable wall panel 19 and the stationary side wall panels 17 are disposed generally vertically and hinged together about a vertical hinge assembly 23, the hinge assembly comprising three conventional butt hinges 24 spaced vertically apart and connecting adjacent first and inner edges 25 and 26 respectively of the panels 17 and 19 respectively. The hinge assembly permits the movable panel 19 to be manually rotated from the full outline normal position relative to the stationary panel through an angle 28 which is shown to be 90 degrees when the assembly is in an operative condition. Thus the panel 19 can assume an extreme fully open position as shown in broken outline at 19.1, although this extreme position would be rarely used in practice. The panel 19 can swing through 180 degrees from the position 19.1 to permit folding of the panels 17 and 19 against each other for storage and transportation. In normal use, it can be seen that an upper portion of the movable panel is clear of the top wall panel to permit relative movement therebetween so as to vary light reflected onto the subject as will be described.

FIGS. 1 AND 3

The apparatus also comprises a hair lighting means or assembly 30 which is connected to and extends rearwardly from the top wall panel 14. The hair lighting means 30 comprises similar left hand and right hand longitudinal rail members 33 and 34 respectively which are essentially straight L-sectioned angle strips. The member 34 is disposed so that a lower horizontal flange 32 thereof is generally adjacent a top surface of the top panel 14. The members 33 and 34 have inner end portions 35 and 36 respectively, and outer end portions 37 and 38 respectively. The means 30 further includes a U-sectioned channel member 41 which interconnects the inner end portions 35 and 36 of the rail members and is shaped so as to releasably engage a front or first edge 43 of the top wall panel 14. An L-sectioned angle member 45 interconnects intermediate portions of the rail members between the respective end portions thereof, and releasably engages a rear edge 46 of the wall panel 14. As seen in FIG. 3, the channel member 41 and the angle member 45 have undesignated upper flanges which are adjacent the lower flange 32 of the rail member 34, and are secured thereto by fasteners, not shown, which pin the members together to permit relative rotation therebetween for folding the apparatus when required.

As seen in FIG. 1, when the means 30 is installed the rail members 33 and 34 are generally parallel to each other, and the channel members 41 and 45 are generally parallel to each other and disposed normally to the rail members. However, because the channel member, the angle member and the rail members are pinned loosely together they can rotate relative to each other to fold together to facilitate storage thereof.

As seen in FIG. 3, the front and rear edges 43 and 46 of the top wall panel 14 are fitted with similar longitudinal L-sectioned angle members 48 and 49 which are disposed parallel to each other and as mirror images of each other. As seen best in FIG. 1, the top panel 14 has similar transverse L-sectioned angle members 51 and 52 which are disposed parallel to each other and are secured to adjacent opposite end portions of the angle members 48 and 49 to define a generally rectangular periphery of the top panel 14. The top panel has an inner wall portion 54 which is preferably a white, lightweight plastic material such as expanded polystyrene, commonly called "STYROFOAM" (trade-mark) which is low cost, lightweight, rigid and provides a suitable diffuse light reflecting surface. The angle members 48, 49, 51 and 52 are preferably extruded aluminum sections, having a typical wall thickness of approximately four millimetres and depth of about three centimetres for each angle. The inner portion 54 is fitted snuggly within the rectangular framework of the angle members, and thus is protected and further stiffened by the peripherally extending angle members. The angle members also provide a rigid and strong material for connecting to adjacent members, e.g. for hinges and for releasable latches as will be described. Furthermore, the angle members are sufficiently stiff to resist twisting forces thereon imposed by the hair lighting means 30. The side wall panels 17, 18, 19 and 20 are constructed similarly to the panel 14.

The hair lighting means 30 further includes a reflector housing 57 mounted adjacent the outer end portions 37 and 38 of the rail members 33 and 34 for movement along the rail members. The reflector housing 57 is generally of truncated pyramidal shape, and has four trapezium-shaped side walls 61 through 64 and a rectangular top wall 65. A suitable light source 67 is mounted on the top wall 65 and directs light downwardly onto a subject, not shown. Similarly to the wall panels, inner surfaces of the reflector housing 57 have diffuse light reflecting surfaces to direct light downwardly onto the subject. It can be seen that lower edges of the side walls 61 through 64 are generally co-planar and engage lower flanges of the rail means which permit easy sliding adjustment of the hair lighting means relative to the top wall panel.

The apparatus also includes a backdrop panel assembly 69 which extends downwardly from the outer end portions 37 and 38 of the hair lighting means. The assembly 69 includes a support member 71, a spindle 72 journalled for rotation relative to the support member, and a sheet of flexible material 74 connected to the spindle and adapted to be rolled around the spindle for storage. The material 74 can be of any suitable colour or light reflecting or absorbing characteristics, and provides a suitable background for a subject located within the apparatus. Preferably, the spindle is spring-loaded for rotation relative to the support members, and is provided with ratchet means to permit extension of the material from the support member to any particular length, as found in a conventional roller blind for a window. Thus the material 74 of the backdrop panel assembly is retractable for storage and is adjustable for different lengths.

The assembly 69 is easily releasably connected to the hair lighting means to simplify assembly and disassembly, and to permit substitution of different backdrop assemblies for different colours and light effects. There are many means of releasably connecting the assembly 69 to the rail members 33 and 34, one example being as follows. The support member 71 is preferably a L-sectioned angle member, with opposite end plates 76 to provide journalling means for the spindle 72. The outer end portions 37 and 38 of the rail members 33 and 34 have aligned horizontal slots 79 extending inwardly from vertical end edges thereof. The slots receive an upper horizontal flange 81 of the support member 71, and can be located in the slot by suitable locking pin means, not shown. The flange 81 of the support member 71 is contacted by the side wall 61 of the reflector housing 57 in a rearmost position thereof and serves as a stop to prevent excessive rearward movement of the housing relative to the rail means, thus preventing the housing 57 from unintentionally falling off the end of the rail members.

FIGS. 1, 2 AND 4

Figure 4:
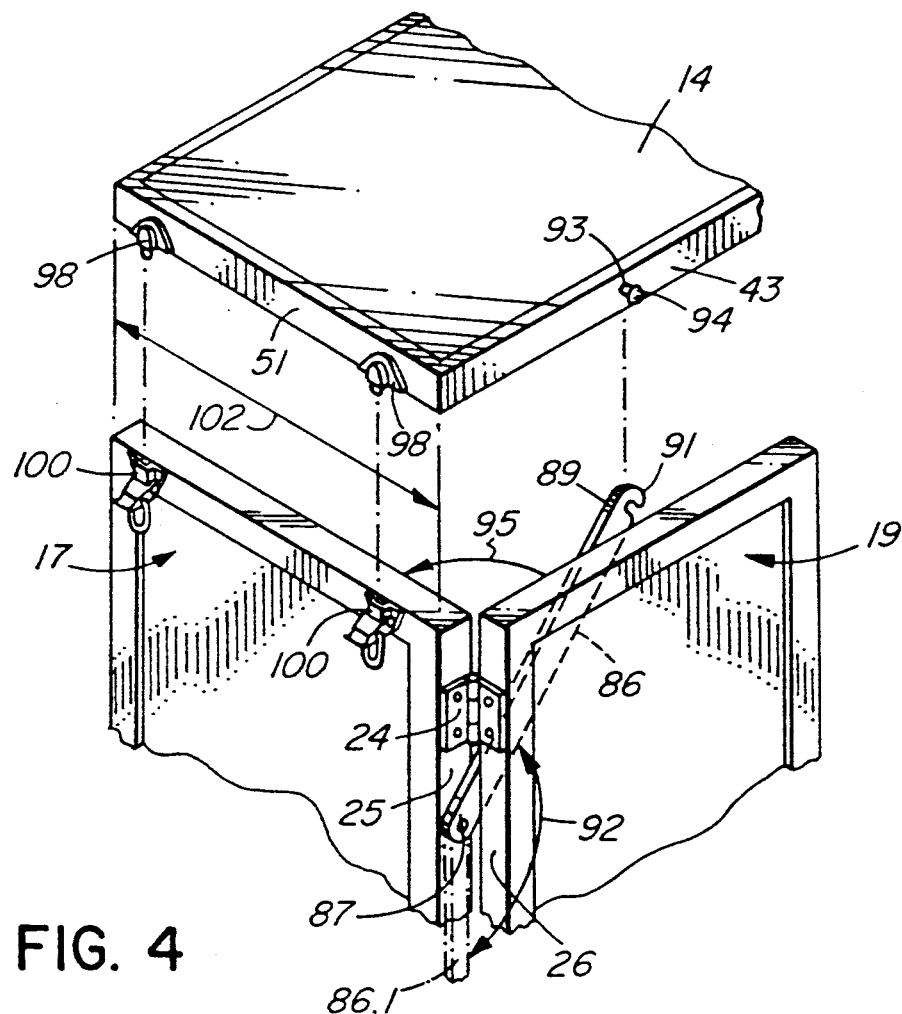
FIG. 4 is a simplified, fragmented isometric view of a top corner of the light reflecting apparatus, showing structure for releasably connecting together portions thereof.

The apparatus 10 further includes a brace 86 having an inner end portion 87 hinged to the first edge 25 of the stationary wall panel 17, and an outer end portion 89 releasably connected to the first or front edge 43 of the top wall panel. The brace 86 has a thickness no greater than a gap between the edges 25 and 26 for any position of the panels 17 and 19. There are many means of releasably connecting the outer end 89 to the panel 14, but one means is as follows. As best seen in FIG. 4, the outer end portion 89 has a hook 91, and the first edge 43 has a projection 93 having an enlarged head 94. The hook 91 engages the projection 93 and is prevented from sliding off the projection by the head 94. The brace 86 can be swung from a raised or operative position as shown in full outline in FIGS. 1 and 4, through an angle 92 to a lowered or retracted position 86.1, as shown partially in FIG. 4. Clearly, when the brace 86 is in the raised position, the movable side wall panel 19 cannot be swung inwardly per arrow 95 to an extreme inner position to lie against the stationary panel 17, due to interference with the brace 86. Only when the brace is swung to the lowered or retracted position 86.1 can the panel 19 be swung against the panel 17, which is usually only required for storage.

Figure 2:
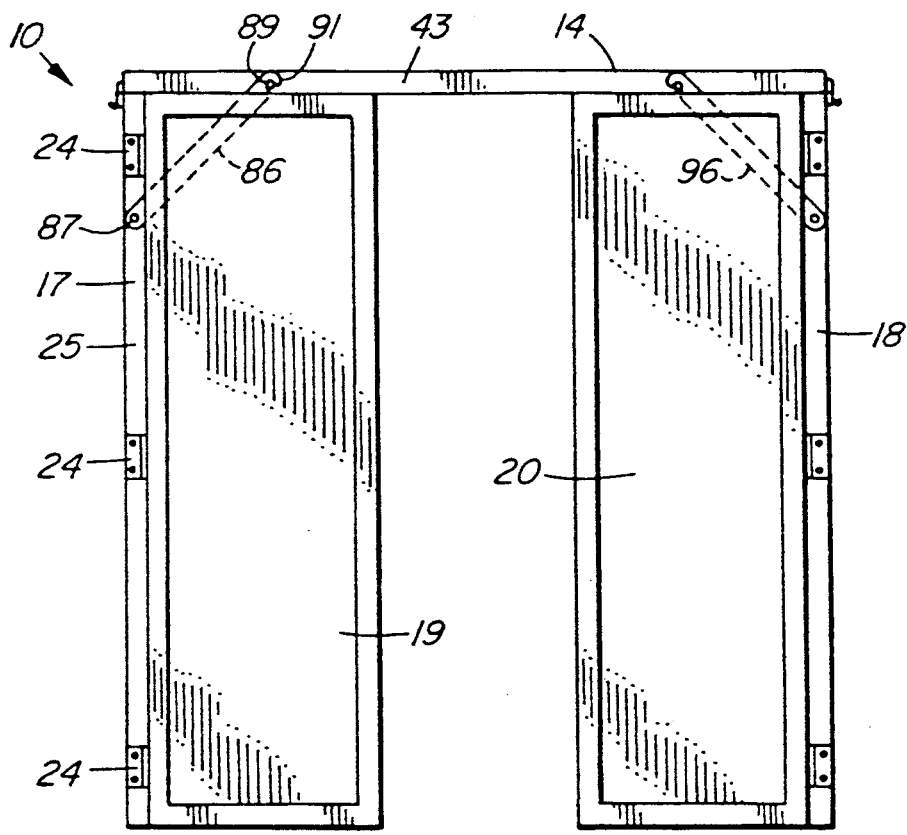
FIG. 2 is a simplified front elevation of the light reflecting apparatus with the hair lighting structure and backdrop panel removed.

As seen best in FIG. 2, a similar brace 96 extends between the top wall panel 14 and the stationary side wall panel 18. Thus, a brace extends releasably between each stationary side wall panel and the top wall panel to increase rigidity of the apparatus, particularly when one or both of the movable panels is fully extended from the stationary wall panel (as seen in broken outline at 19.1 in FIG. 1) so as to be aligned with the stationary panel. The braces are positioned adjacent the front edge 43 of the panel 14 to avoid appearing in a photograph. If the braces were located adjacent the rear edge 46, the braces could appear in the photograph or cast shadows on the material 74.

As best seen in FIG. 4, the transverse angle member 51 adjacent the left hand end portion of the top wall panel 14 carries a pair of spaced apart latch portions 98 which cooperate with complementary latch portions 100 fitted adjacent a top portion of the stationary side wall panel 17. The latch portions 98 and 100 are well known releasable "over-centering hinged loop devices" which secure the top wall portion to the respective stationary side wall portion. Preferably, the panels 14, 17 and 18 have a similar width 102, which ensures that the movable panels 19 and 20 are clear of the top wall panel for a normal range movement as shown in FIG. 1, as the first edge 25 of the panel 17 is co-planar with the first edge 43 of the top wall panel. Also, preferably the movable panels 19 and 20 have a similar width to the other panels, so as to facilitate manufacturing, and also storage when the movable panels are swung together towards each other so as to be parallel to and adjacent each other.

OPERATION

FIG. 5

A typical studio arrangement is shown, in which the side wall pairs 11 and 12 of the apparatus are disposed to be mirror images of each other, with the movable panels 19 and 20 disposed at approximately right angles to the respective stationary panels 17 and 18. A camera 107 is disposed with a field of view directed between adjacent oppositely facing outer edges of the movable panels 19 and 20, and aimed at a subject 109 positioned in front of the material 74 of the backdrop panel assembly 69, if this is used. A pair of conventional lights 111 are directed away from the subject so as to shine light directly onto the panels 19 and 20 when the direction of the lamp is shown as in full outline, or against the panels 17 and 18 when the lamp is directed as shown in broken outline at positions 111.1. Clearly, the lamps could be directed towards the hinges of the side wall pairs, or asymmetrically to attain a desired control of lighting on the subject. Light is reflected from the panels in a diffuse manner from the inwardly facing surfaces of the panels, and additional light can be obtained from the hair lighting assembly, not shown in FIG. 5. Clearly, many variations are possible by changing the angle and height of the lamps 111, the angle 28 of the movable panels 19 and 20, and the position of the light of the hair lighting assembly with respect to the top wall panel. Thus many lighting arrangements can be attained with the use of only two or three lights and a relatively low cost apparatus.

Clearly, the apparatus can be quickly and easily assembled and disassembled so that it can be installed in almost any site or room, with the surroundings of the apparatus having essentially negligible effect on the lighting and subject.

What is claimed is:
1. A light reflecting apparatus for photography, the apparatus comprising:
   (a) left hand and right hand laterally spaced apart vertical side wall pairs, each side wall pair having a stationary side wall panel and a movable side wall panel with inwardly facing diffuse light reflecting surfaces, the movable wall panel and stationary wall panel of each vertical side wall pair being hinged together about a vertical hinge to permit the movable panel to rotate relative to the stationary panel, the stationary panels of each pair having lower portions for setting on a supporting surface to support each pair of panels so that the panels thereof are essentially vertical,
   (b) a horizontal top wall panel supported on and extending between the stationary side wall panels, the top wall panel having a downwardly facing diffuse light reflecting surface and being releasably connected to the stationary side wall panels, the movable panels being clear of the top wall panel to permit each movable panel to rotate about the respective vertical hinge relative to the adjacent stationary panel.
2. An apparatus as claimed in claim 1 further comprising:
   (a) a hair lighting means for mounting a light thereon, the hair lighting means being connected to the top wall panel.
3. An apparatus as claimed in claim 2 further comprising:
   (a) a backdrop panel assembly extending downwardly from the hair lighting means.
4. An apparatus as claimed in claim 4 in which:
   (a) the backdrop panel assembly is retractable for storage and is releasably connected to the hair lighting means.
5. An apparatus as claimed in claim 4 in which:

(a) the backdrop panel assembly comprises a support member, a spindle and a sheet of flexible material connected to the spindle and adapted to be rolled around the spindle for storage, the support member journalling the spindle for rotation relative thereto and being releasably connected to hair lighting means.

6. An apparatus as claimed in claim 2 in which:
(a) the light of the hair lighting means is movable relative to the top wall panel.

7. An apparatus as claimed in claim 2 in which the hair lighting means further comprises:
(a) left hand and right hand longitudinal rail members, each rail members having inner and outer end portions, the inner end portion being releasably connected to the top wall panel,
(b) a reflector housing having the light and being mounted adjacent the outer end portions of the rail members for movement along the rail members.

8. An apparatus as claimed in claim 7 in which:
(a) the rail members are straight and can be disposed generally parallel to each other,
(b) a channel member interconnects the inner end portions of the rail members and releasably engages the top wall panel,
(c) an angle member interconnects intermediate portions of the rail members and releasably engages the top wall panel, the angle member and channel member being straight and generally parallel to each other when the rail members are disposed so as to be generally parallel to each other,
(d) the channel member, the angle member and the rail members are pinned loosely together to permit the members of the hair lighting means to rotate relative to each other so as to fold together to facilitate storage thereof.

9. An apparatus as claimed in claim 1 in which:
(a) the top wall panel is generally flat and has opposite end portions releasably connected to adjacent top portions of the stationary wall panels,
(b) a brace extends releasably between each stationary side wall panel and the top wall panel to increase rigidity of the apparatus.

10. An apparatus as claimed in claim 9 in which:
(a) the stationary side wall panels are disposed parallel to each other, and each stationary side wall panel has a similar width and a respective first edge having hinge means adjacent the respective movable side wall panel,
(b) the top wall panel has a width similar to width of the side wall panels and a first edge generally coplanar with and extending between the first edges of the stationary wall panels,
(c) each brace has an inner end portion hinged to the respective first edge of the respective stationary wall panel, and an outer end portion releasably connected to the first edge of the top wall panel.

11. A light reflecting apparatus for photography, the apparatus comprising:
(a) left hand and right hand laterally spaced apart vertical side wall pairs, each side wall pair having a stationary side wall panel and a movable side wall panel with inwardly facing diffuse light reflecting surfaces, the stationary side wall panels of each vertical side wall pair having co-planar lower portions for setting on a supporting surface to support the apparatus with the panels thereof being essentially vertical,
(b) a horizontal top wall panel supported on and extending between the stationary side wall panels, the top wall panel having a downwardly facing diffuse light reflecting surface, the top wall panel being generally flat and having opposite end portions releasably connected to adjacent top portions of the stationary wall panels, the movable panels being clear of the top wall panels to permit relative movement therebetween,
(c) a brace extending releasably between each stationary side wall panel and the top wall panel to increase rigidity of the apparatus.

12. An apparatus as claimed in claim 1 in which:
(a) the movable wall panel and stationary wall panel of each vertical side wall pair are hinged together about a vertical hinge to permit the movable panel to rotate relative to the stationary panel.

13. An apparatus as claimed in claim 12, in which:
(a) the stationary side wall panels are disposed parallel to each other, and each stationary side wall panel has a similar width and a respective first edge having hinge means adjacent the respective movable side wall panel,
(b) the top wall panel has a width similar to width of the side wall panels and a first edge generally coplanar with and extending between the first edges of the stationary wall panels,
(c) each brace has an inner end portion hinged to the respective first edge of the respective stationary wall panel, and an outer end portion releasably connected to the first edge of the top wall panel.

14. A light reflecting apparatus for photography, the apparatus comprising:
(a) left hand and right hand laterally spaced apart vertical side wall pairs, each side wall pair having a stationary side wall panel and a movable side wall panel with inwardly facing diffuse light reflecting surfaces, the stationary side wall panels of each vertical side wall pair having co-planar lower portions for setting on a supporting surface to support the apparatus with the panels thereof being essentially vertical,
(b) a horizontal top wall panel supported on and extending between the stationary side wall panels, the top wall panel having a downwardly facing diffuse light reflecting surface, the movable panels being clear of the top wall panel to permit relative movement therebetween,
(c) a hair lighting means for mounting a light thereon, the hair lighting means being connected to the top wall panel and being movable relative thereto.

15. A light reflecting apparatus for photography, the apparatus comprising:
(a) left hand and right hand laterally spaced apart vertical side wall pairs, each side wall pair having a stationary side wall panel and a movable side wall panel with inwardly facing diffuse light reflecting surfaces,
(b) a horizontal top wall panel supported on and extending between the stationary side wall panels, the top wall panel having a downwardly facing diffuse light reflecting surface, the movable panels being clear of the top wall panel to permit relative movement therebetween,
(c) a hair lighting means for mounting a light thereon, the hair lighting means being connected to the top wall panel and including left hand and right hand longitudinal straight rail members, each rail member having inner and outer end portions and being disposable generally parallel to each other, the inner end portions being releasably connected to the top wall panel, a channel member interconnecting the inner end portions of the rail members and releasably engaging the top wall panel, an angle member interconnecting intermediate portions of the rail members and releasably engaging the top wall panel, the angle member and the channel member being straight and generally parallel to each other when the rail members are disposed so as to be generally parallel to each other, the channel member, the angle member and the rail members being pinned loosely together to permit the members of the hair lighting means to rotate relative to each other so as to fold together to facilitate storage thereof, (d) a reflector housing having the light and being mounted adjacent the outer end portions of the rail members for movement along the rail members.

16. An apparatus as claimed in claim 15, further comprising:
    (a) a back drop panel assembly extending downwardly from the rail members of the hair lighting means.

17. An apparatus as claimed in claim 16, in which:
    (a) the back drop panel assembly is retractable for storage and is releasably connected to the rails of the hair lighting means.

18. An apparatus as claimed in claim 17, in which:
    (a) the backdrop panel assembly comprises a support member, a spindle and a sheet of flexible material connected to the spindle and adapted to be rolled around the spindle for storage, the support member journalling the spindle for rotation relative thereto and being releasably connected to outer end portions of the rail means.

* * * * *